US009469427B2

(12) United States Patent
Giuliani

(10) Patent No.: US 9,469,427 B2
(45) Date of Patent: Oct. 18, 2016

(54) LABELLING MACHINE AND METHOD

(71) Applicant: SIDEL S.p.A. con Socio Unico, Parma (IT)

(72) Inventor: Mattia Giuliani, Parma (IT)

(73) Assignee: SIDEL S.p.A. con Socio Unico, Parma (IT)

( * ) Notice: Subject to any disclaimer, the term of this patent is extended or adjusted under 35 U.S.C. 154(b) by 304 days.

(21) Appl. No.: 13/903,557

(22) Filed: May 28, 2013

(65) Prior Publication Data

US 2013/0312896 A1 Nov. 28, 2013

(30) Foreign Application Priority Data

May 28, 2012 (IT) .............................. TO2012A0463

(51) Int. Cl.

| | |
|---|---|
| ***B32B 41/00*** | (2006.01) |
| ***B65C 9/04*** | (2006.01) |
| ***B65C 3/00*** | (2006.01) |
| ***B65C 3/06*** | (2006.01) |
| ***B65C 9/06*** | (2006.01) |
| ***B65C 9/40*** | (2006.01) |

(52) U.S. Cl.

CPC . *B65C 9/04* (2013.01); *B65C 3/00* (2013.01); *B65C 3/065* (2013.01); *B65C 9/06* (2013.01); *B65C 9/40* (2013.01); *Y10T 156/10* (2015.01); *Y10T 156/1771* (2015.01)

(58) Field of Classification Search

CPC ........... B65C 3/065; B65C 3/14; B65C 9/04; B65C 9/08; B65C 9/1819; B65C 9/40; B65C 65/7847; B65C 66/8161; B29L 2031/744; Y10T 156/1033; Y10T 156/17

USPC .......... 156/64, 350, 351, 360, 378, 379, 567

See application file for complete search history.

(56) References Cited

U.S. PATENT DOCUMENTS

2006/0037706 A1* 2/2006 Putzer .......................... 156/360

FOREIGN PATENT DOCUMENTS

| | | | |
|---|---|---|---|
| DE | 19716079 | A | 4/1998 |
| DE | 20019062 | U1 | 12/2001 |
| EP | 0547754 | A2 | 6/1993 |
| WO | WO-2010040397 | A1 | 4/2010 |
| WO | WO-2011018806 | A1 | 2/2011 |
| WO | WO-2012107812 | A2 | 8/2012 |

OTHER PUBLICATIONS

"Italian Application Serial No. IT T020120463, Search Report dated Feb. 13, 2013", 9 pgs.

* cited by examiner

*Primary Examiner* — Michael N Orlando
*Assistant Examiner* — Joshel Rivera
(74) *Attorney, Agent, or Firm* — Schwegman Lundberg & Woessner, P.A.

(57) ABSTRACT

There is disclosed a labelling machine for applying sleeve labels on respective articles, comprising: a conveyor movable along a path comprising, in turn, a first inlet station for the articles still to be labelled and a second outlet station for the labelled articles; the conveyor comprises a handling device adapted to displace at least one first of the sleeve label and the article still to be labelled along a first segment of the path, so as to insert the article still to be labelled within the sleeve label; the conveyor also comprises a positioning device adapted to actively position a second of the sleeve label and the article in a desired position with respect to the first of the article and the sleeve label along a second segment of the path; the first segment is comprised within the second segment.

12 Claims, 7 Drawing Sheets

LABELLING MACHINE AND METHOD

PRIORITY CLAIM AND RELATED APPLICATIONS

This application claims the benefit of priority under 35 U.S.C. Section 119 to Italian Patent Application Serial No. TO2012A 000463, filed on May 28, 2012, which Application is incorporated herein by reference in its entirety.

TECHNICAL FIELD

The present document relates to a labelling machine and a method for applying sleeve labels on respective articles, in particular containers for pourable products.

BACKGROUND

The application of sleeve labels on containers filled with pourable food products is known in the field of labelling.

The above said sleeve labels are obtained by:

- cutting a plurality of flat rectangular or square labels from a tape which is unwound from a reel;
- overlapping, by folding, the opposite vertical edges of each cut label so as to form a respective sleeve label; and
- welding the opposite edges of each label.

Patent application WO-A-018806, in the name of the same Applicant, discloses, for example, labelling machines, in which each sleeve label is first formed on a respective sleeve drum, and then transferred on a relative container, for example by inserting the latter within the corresponding sleeve label.

The above said labelling machines of the known type substantially comprise:

- a carousel rotatable about a first axis arranged, in use, vertically; and
- a plurality of carrying units for respective containers, arranged along a circumferential edge of the carousel and rotated about the first axis of the carousel along a labelling path.

Each carrying unit is also fed with a relative container to be labelled at an inlet station of the labelling path and provides the relative container on which the sleeve label has been applied at an outlet station of the labelling path.

Proceeding from the inlet station to the outlet station along the labelling path, each carrying unit is also fed with a relative flat label, forms a relative sleeve label and applies this sleeve label to the relative container.

Each carrying unit also comprises a lower support element adapted to support a lower wall of the relative container and an upper retaining device adapted to cooperate with an upper portion of the relative container to retain it in a vertical position during the rotation of the carousel about the first vertical axis.

Each support element comprises, in turn:

- a tubular upright, which is fixed to a horizontal plane rotatable of the carousel; and
- the cylindrical sleeve drum, which engages the relative tubular upright in a rotatable and axially sliding manner with respect to a second axis.

In particular, the sleeve drum supports a relative container on its upper surface.

Each sleeve drum is also mobile under the control of a cam, between:

- a totally lowered position reached at the inlet and outlet station of the conveying path; and
- a lifted position reached between the inlet and the outlet stations of the conveying path.

Each sleeve drum also comprises a pneumatic driving device formed by a vacuum source and a plurality of suction holes arranged on its side surface and connectable selectively with the vacuum source.

In the totally lowered position, the sleeve drum is substantially contained within the upright to allow the container to enter or exit on/from the carousel.

In the lifted position, each sleeve drum projects from an upper surface of the relative support element and is adapted to receive a respective flat label on its side surface.

The sleeve drum also rotates about its second axis to allow the flat label to be completely wound about the sleeve drum until it reaches a tubular configuration, in which the opposite vertical edges thereof overlap.

More precisely, during the winding of the label, the driving device is actuated so as to retain the label on the side surface of the sleeve drum in virtue of the action of vacuum.

Each carrying unit finally comprises a welding bar adapted to longitudinally weld the overlapped edges of the relative sleeve label.

Once the welding of the overlapped edges of the sleeve label is completed, the driving device is switched off and the sleeve drum is returned to the lowered position within the upright.

Accordingly, the sleeve label is released from the side surface of the sleeve drum, is retained above the upright by an upper annular edge of the upright, and finally is slidingly engaged by the relative container.

At the outlet of the carousel, the containers are fed in a substantially vertical position by a conveying device through a heating device adapted to shrink the labels about the bottles.

Since the sleeve labels are fed through the heating device always in contact with a resting plane defined by the above mentioned conveying device, the known labelling machines of the above disclosed type have some drawbacks mainly resulting from the fact that such machines do not allow to selectively control the position of the sleeve labels along the relative containers and therefore have a relatively low flexibility.

A similar solution is also known from WO2010/040397 in the name of the same Applicant.

In order to selectively control the position of the sleeve labels along the relative containers, the same Applicant has proposed in patent application PCT/IB2011/055591 a labelling machine comprising:

- a carousel of the above disclosed type, which provides containers with the relative sleeve labels in a first position; and
- an additional module fed by the carousel and adapted to displace the sleeve labels in a second position with respect to the relative container.

More precisely, the module comprises:

- a further carousel rotatable about a third axis;
- a plurality of further carrying units for respective containers arranged along a circumferential edge of the further carousel and rotated about the third axis by the further carousel; and
- a plurality of transfer devices arranged along a circumferential edge of the further carousel, associated with respective carrying units and adapted to displace respective sleeve labels along relative fourth axes parallel to the third axis with respect to the corresponding containers.

In greater detail, each further carrying unit comprises: a plate adapted to support the lower wall of the relative container, and a retaining element mobile between a lifted position in which it allow the entry and exit of the container on/from the module and a lowered position in which it cooperates with an upper portion of the relative container.

Each transfer device is mobile in parallel to the respective fourth axis and comprises a surface provided with a plurality of holes connectable to a vacuum source to retain the relative sleeve label and move the latter from the respective first to the respective second position.

The need is felt in the field to selectively control the position of the sleeve labels along the relative containers with a labelling machine as simple as possible.

Furthermore, the sleeve labels still have not been subjected to any thermal retraction when they are transferred from the carousel to the module, in the solution shown in patent application PCT/IB2011/055591.

Therefore, the labels have not yet been stably fixed to the relative containers when they reach the module.

Therefore, the solution shown in patent application PCT/IB2011/055591 does not allow to control the angular position of each sleeve label with respect to its axis, i.e. to ensure a predetermined angular orientation with respect to an axis of the container.

The need is therefore felt in the field to apply the sleeve labels on the respective containers in a desired angular position.

EP-547754 discloses a labelling machine, in which containers to be labelled are inserted within respective sleeve labels.

More precisely, as the containers move, respective sleeve labels are at first retained in a given position and then move together with respective containers.

DE-A-19716079 discloses a labelling machine, in which the sleeve labels move towards respective containers and are inserted onto respective containers at respective given prescribed positions.

More precisely, the labelling machine comprises a plurality of grippers which both move the respective labels relative to corresponding containers and apply those respective labels onto corresponding containers at respective prescribed positions.

OVERVIEW

Examples of the present subject matter provide a labelling machine, which satisfies at least one of the above cited needs in a simple and cost-effective manner.

The aforementioned is achieved by the present subject matter as it relates to a labelling machine for applying sleeve labels on relative containers, as defined in claim 1.

The present subject matter also relates to a method for applying sleeve labels on relative containers, as defined in claim 14.

BRIEF DESCRIPTION OF THE DRAWINGS

Two embodiments are hereinafter disclosed for a better understanding of the present subject matter, by way of non-limitative example and with reference to the accompanying drawings, in which.

DETAILED DESCRIPTION

Figure 1:
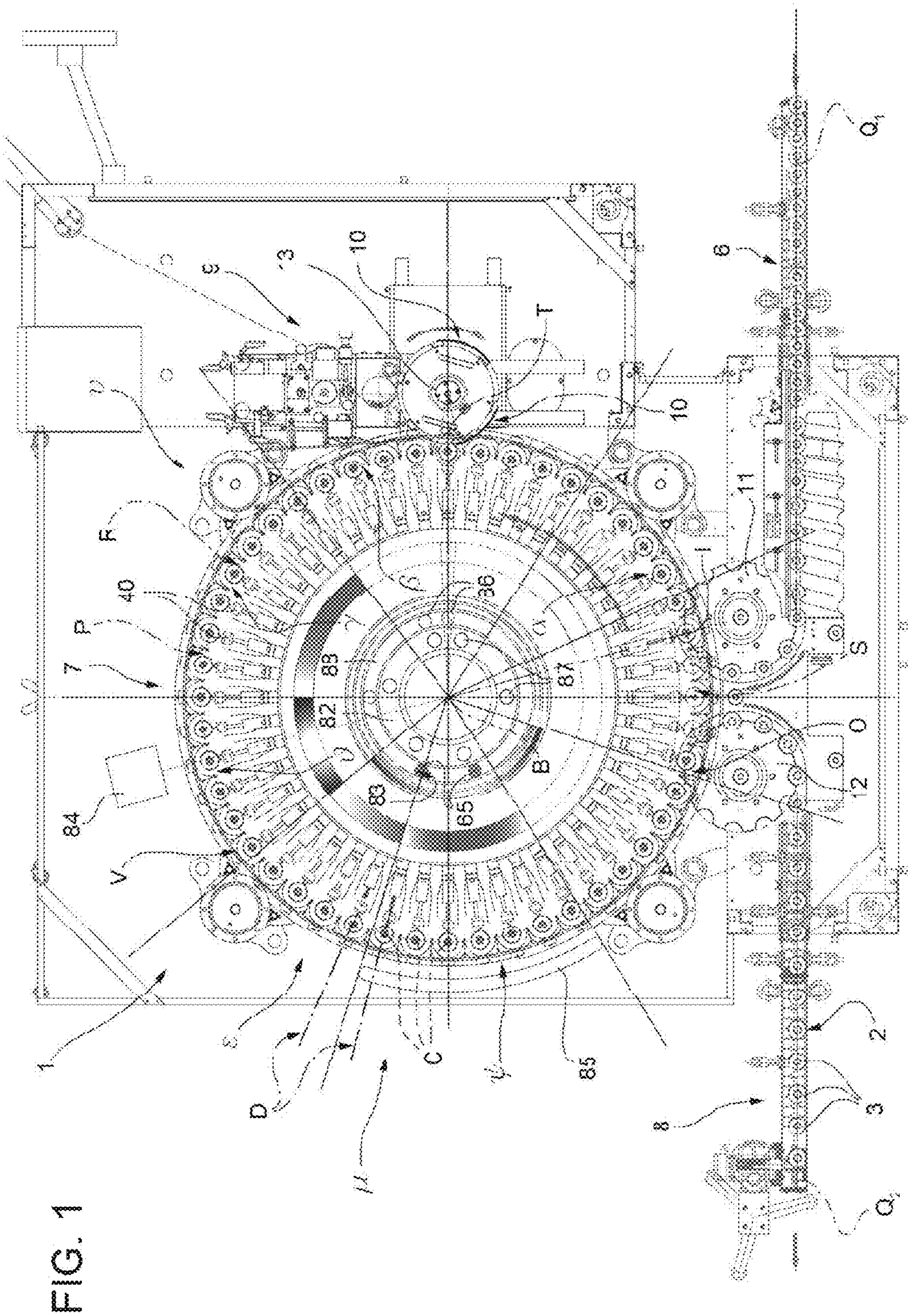
FIG. 1 shows a diagrammatic plan view of a labelling machine according to the dictates of the present subject matter, with parts removed for clarity.
Figure 2:
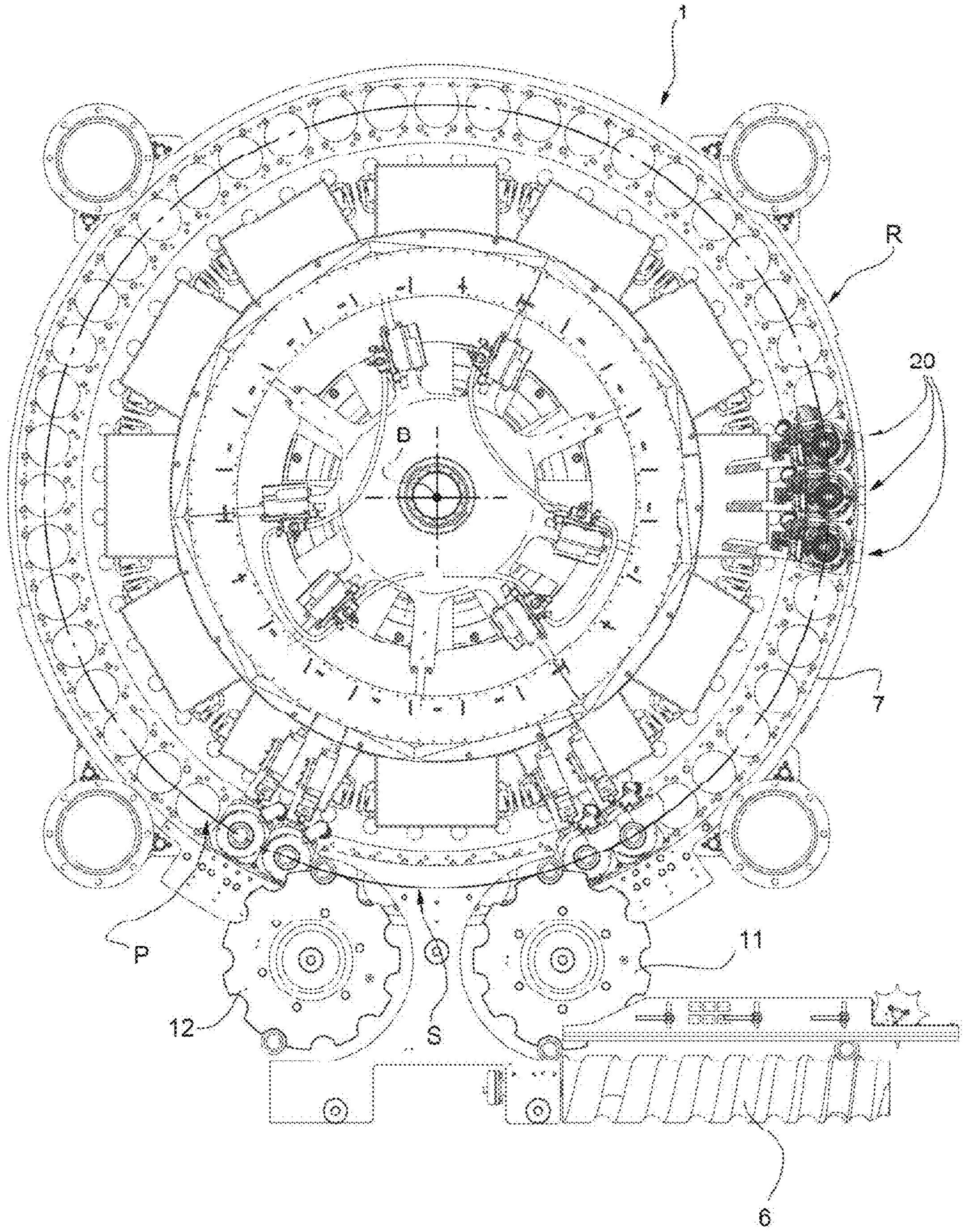
FIG. 2 shows a plan view on an enlarged scale of first components of the labelling machine of FIG. 1, with parts removed for clarity.

With reference to FIGS. 1 and 2, numeral 1 indicates a labelling machine for applying sleeve labels 2 on respective articles, in particular containers 3 intended to be filled with a pourable food product.

Figure 10:
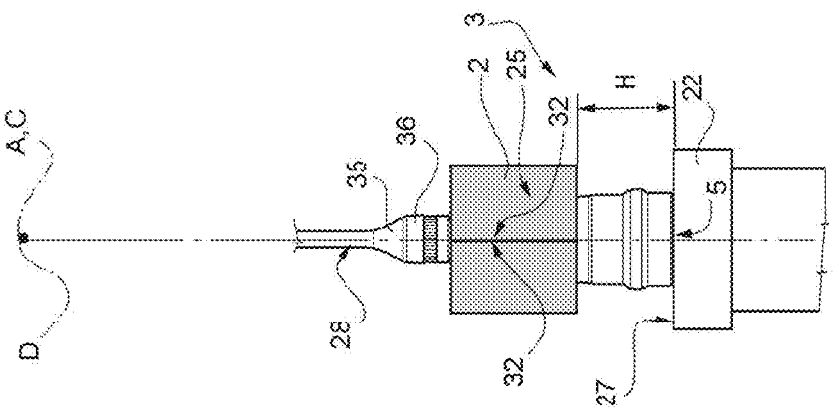
FIGS. 8 to 10 show respective subsequent steps of the operation of the labelling machine of FIGS. 1 and 2.
Figure 9:
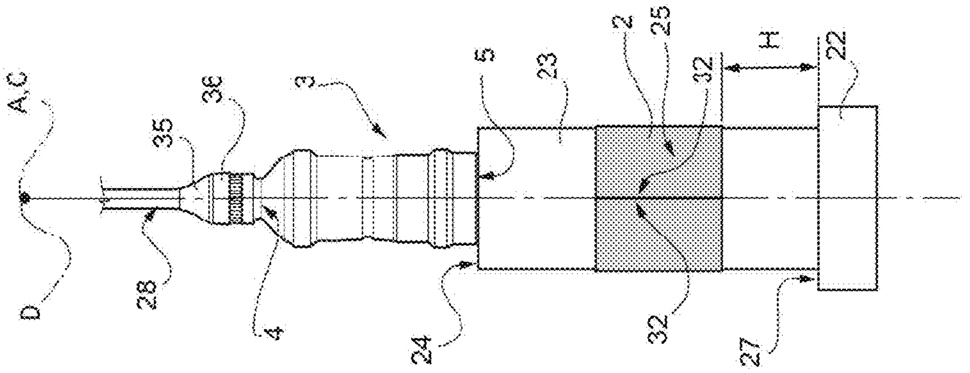
Figure 8:
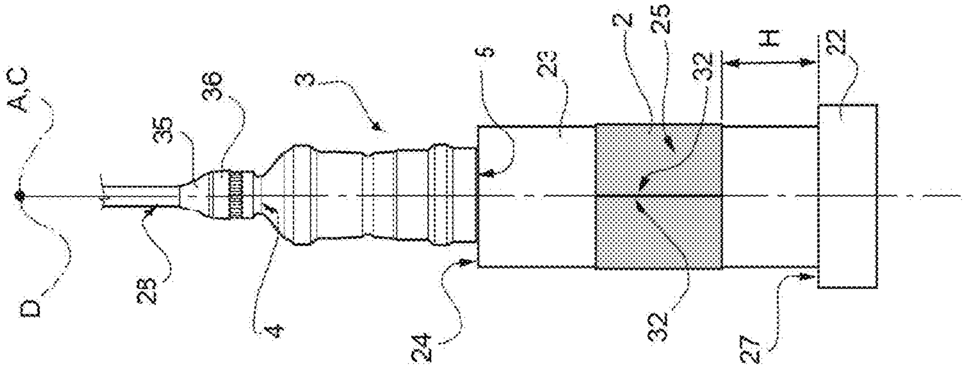

As shown in FIGS. 8 to 10, each container 3 is elongated along an axis A, is defined by a lower wall 5 orthogonal to axis A and comprises a neck portion 4 coaxial to axis A.

In particular, machine 1 comprises:

- a conveyor 6 and an inlet star-wheel 11;
- a carousel 7 rotatable about a circular path P having axis B, fed by conveyor 6 with containers 3 still to be labelled and adapted to provide labelled containers 3;
- a labelling module 9 adapted to feed carousel 7 with a sequence of flat labels 10 intended to form respective sleeve labels 2; and
- an outlet conveyor 8 and an outlet star-wheel 12.

In detail, conveyors 6, 8 are of the Archimedean screw type and feed containers 3 along respective linear paths $Q_1$, $Q_2$.

Starwheels 11, 12 are rotatable about respective axes parallel to axis B and are tangent to carousel 7 respectively in stations I, O.

In particular, starwheel 11 is interposed between conveyor 6 and carousel 7; and starwheel 12 is interposed between carousel 7 and conveyor 8.

Labelling module 9 substantially comprises a drum 13 rotatable about an axis thereof parallel to axis B.

In greater detail, carousel 7 comprises (FIG. 2) a plurality of carrying units 20 angularly equally spaced about axis B, mounted on a peripheral edge of carousel 7, and fed by carousel 7 along path P.

Path P comprises:

- a conveying segment R of containers 3 extending between stations I, O and between starwheels 11, 12; and
- a return segment S extending between stations I, O and between starwheels 11, 12.

Each container 3 is arranged in a lowered position at stations I, O of path P.

With reference to each container 3 displaced by a relative carrying unit 20, segment R comprises, proceeding from station I towards station O, (FIG. 1):

- an arc α, along which container 3 is displaced from the relative lowered position to a lifted position;
- a station T, at which drum 13 transfers flat labels 10 to carrying unit 20 of carousel 7;
- an arc β for forming sleeve label 2 from respective label 10 (FIG. 8);

an arc γ for welding sleeve label 2; and an arc ϵ, along which container 3 is displaced from the lifted position to the lowered position, so as to insert container 3 within sleeve label 2 (FIG. 10).

Figure 4:
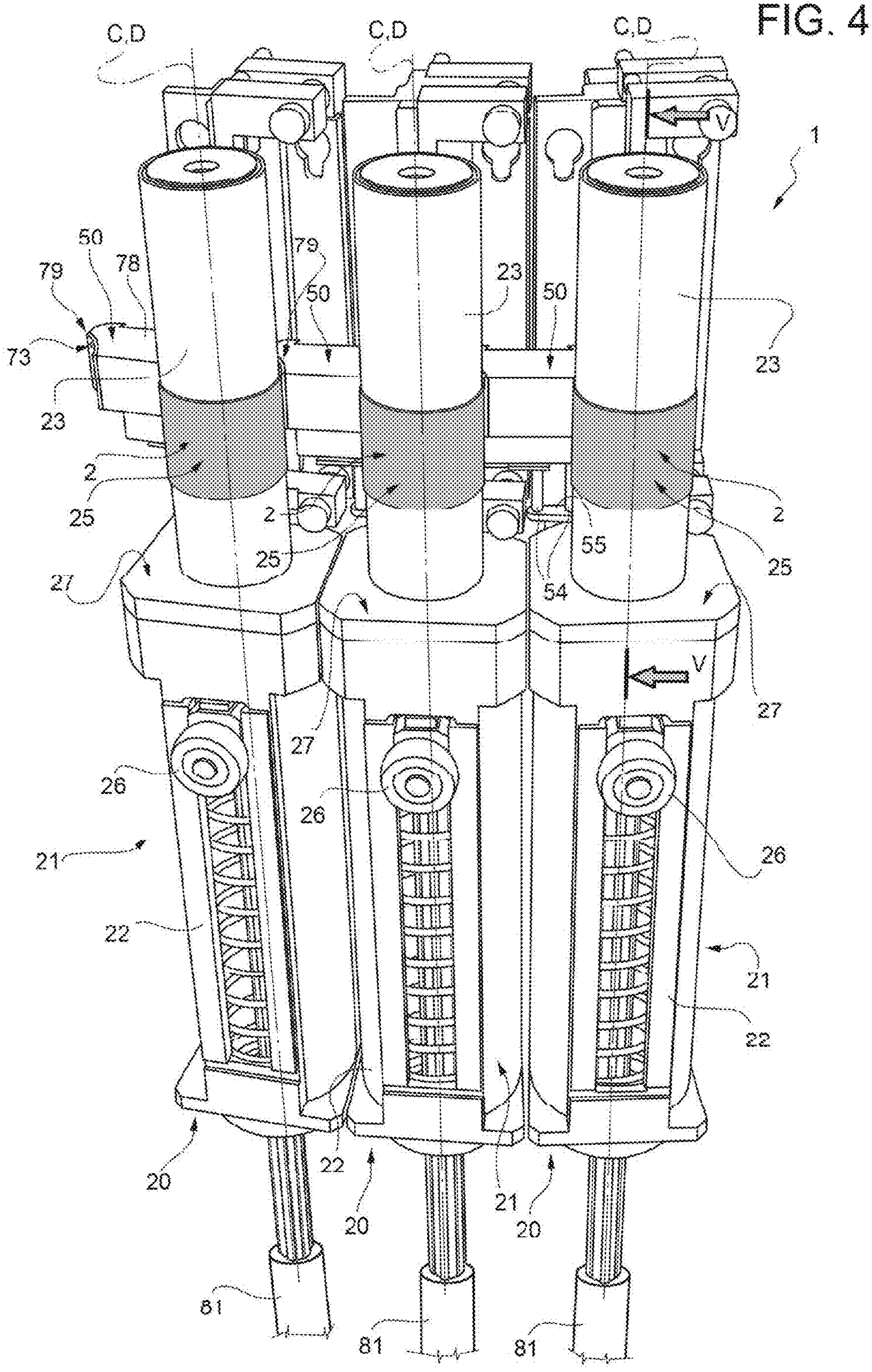
FIG. 4 shows a perspective view on a strongly enlarged scale of second components of the labelling machine of FIGS. 1 and 2.
Figure 5:
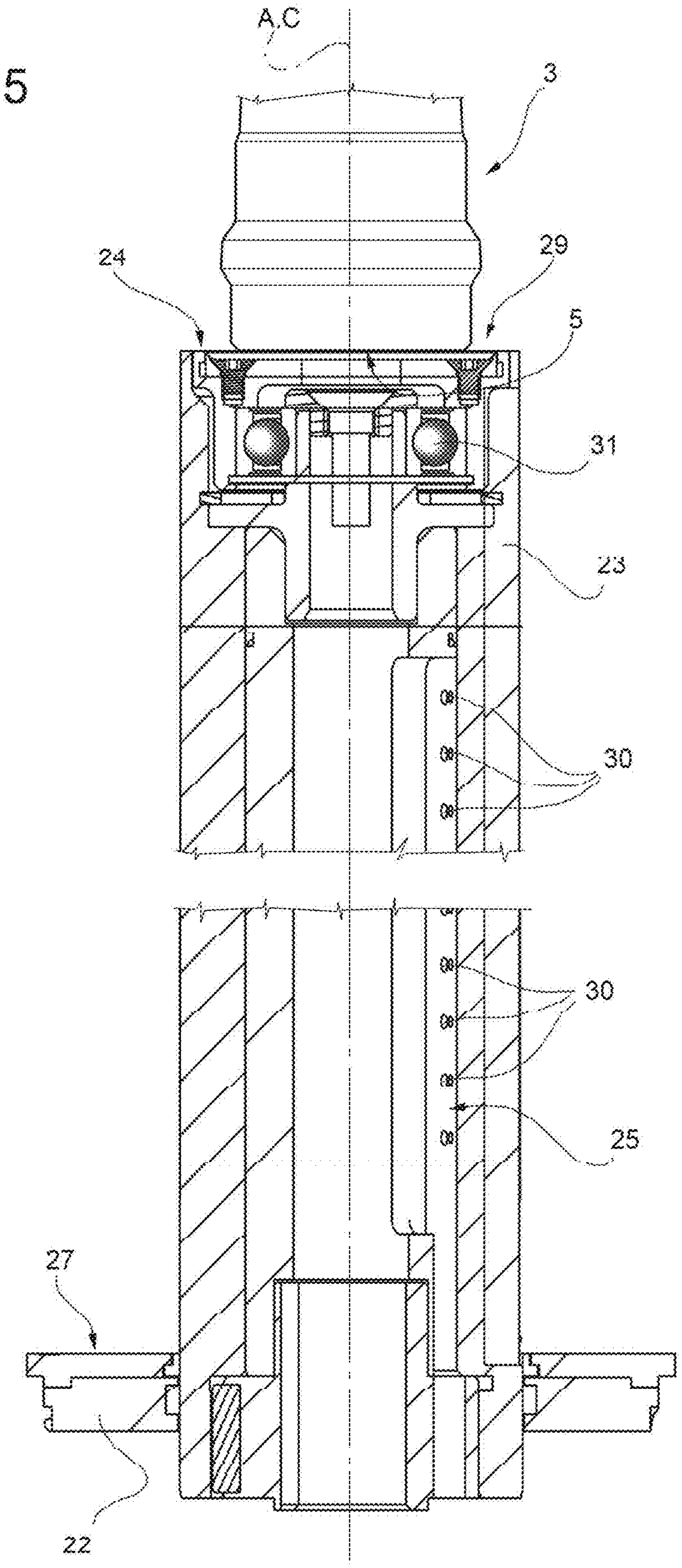
FIG. 5 is a section taken along line V-V of FIG. 4, with parts removed for clarity.

With reference to FIGS. 4 and 5 and from 8 to 10, each carrying unit 20 comprises:

support unit 21 adapted to support wall 5 of respective container 3; and a retaining device 28 (FIG. 5) adapted to cooperate with neck portion 4 of respective container 3.

In particular, support unit 21 of each carrying unit 20 comprises in turn:

a hollow upright 22 elongated along axis C parallel to axis B and fixed to a horizontal plane 29 rotatable about axis B of carousel 7; and a hollow sleeve drum 23, mounted rotatably about axis C and sliding about axis C on respective upright 22, and a plate 29 (FIG. 5) borne by sleeve drum 23 and defining an upper surface 24, orthogonal to axis C and adapted to support respective container 3.

Unit 21 of each carrying unit 20 also comprises a bearing 31 interposed between relative plate 29 and relative sleeve drum 23.

Bearing 31 makes plate 29 and sleeve drum 23 integral along axis C whereas it makes drum 23 angularly mobile about axis C with respect to plate 29.

Each sleeve drum 23 defines a cylindrical side surface 25 having axis C and adapted to cooperate with a respective flat label 10 and corresponding sleeve label 2.

Each sleeve drum 23 is also mobile along axis C and integral with plate 29 under the control of a cam interacting with relative cam follower 26 (FIG. 4) borne by respective carrying unit 20, between a relative position which is completely retracted in which it is housed together with plate 29 within respective upright 22 and a relative lifted position.

Each sleeve drum 23, when arranged in a totally retracted position, is completely housed within relative upright 22 so that surface 24 of relative plate 29 is at the same level and therefore coplanar with upper surface 27 of relative upright 22.

Each sleeve drum 23, when arranged in the lifted position, projects from surface 27 of relative upright 22 and is adapted to receive, on its surface 25, a relative label 10 from sleeve drum 13 at station T of path P.

More precisely, each label 10 is transferred from drum 13 to sleeve drum 23 at a distance H from surface 27 of relative upright 22 (FIG. 8).

Following the interaction of each cam follower 26 with the cam (not shown), each sleeve drum 23:

is displaced from the respective totally retracted position to the lifted position along arc α of segment R, so as to determine the lifting of plate 29 and container 3 along relative axis C;

remains in the respective lifted position along the portion of segment R interposed between art α and arc ϵ; and is displaced from the respective lifted position to the totally retracted position along arc ϵ of segment R, so as to determine the lowering of relative plate 29 and container 3 along relative axis C.

Flat labels 10 are cut in a known manner from a tape by means of a cutting device (not shown) and fed to drum 13 so as to subsequently be fed to relative sleeve drums 23, at station T of path P.

In detail, cut labels 10 are retained, by means of the action of vacuum, on a side surface of drum 13, along arc β of segment R of path P.

More in particular, surface 25 of each sleeve drum 23 comprises a plurality of through-holes 30 (FIG. 5) adapted to exert a suction action on relative label 3, along arc β of path P and adapted not to exert any suction action in the remaining portion of path P.

Each sleeve drum 23 rotates, in a manner known per se, about relative axis C along arc β of segment R of path P, under the action of a relative actuator 81 which is diagrammatically shown in FIG. 4.

Thereby, each label 10 exiting from drum 13 is totally wound about surface 25 of relative sleeve drum 23, so as to form a relative cylinder with opposite respective vertical edges 32 overlapped to one another (Figures from 8 to 10), along arc β of segment R of path P.

It should be noted that each label 10 and corresponding sleeve label 2 are maintained at the same distance H from surface 27 of relative upright 22, along arcs β, γ of segment R of path P.

As shown in FIGS. 8 to 10, device 28 of each carrying unit 20 comprises in a known manner a cylindrical element 35 protruding from a horizontal plane (not shown) of carousel 7 rotatable about axis B.

Element 35 of each carrying unit is mobile in parallel to relative axis C and has a free portion 36 configured, in the case shown, like a bell and adapted to cooperate with neck portion 4 of relative container 3 borne by corresponding unit 21.

More in particular, the displacement parallel to relative axis C of each element 35 is controlled so that the distance between its free portion 36 and surface 24 of plate 29:

is constant, during the displacement of relative carrying unit 20 along segment R of path P; and increases at stations I, O of path P and during segment S of path P.

Thereby, containers 3 are held firmly in the respective vertical positions along segment R of path P, and can be transferred freely from starwheel 11 to station I and from starwheel 12 to station O.

Each carrying unit 20 finally comprises a relative welding device 40 (diagrammatically shown in FIG. 1) adapted to cooperate with label 10 wound on sleeve drum 23 so as to weld edges 32 overlapped to one another and form sleeve label 2, at arc γ of segment R.

Advantageously, carousel 7 comprises a plurality of positioning devices 50 adapted to actively position sleeve labels 2 in respective desired positions with respect to corresponding container 3, along an arc μ of path P, which comprises arc ϵ.

By the term "actively position" there is intended, in the present description, that the positioning devices 50 are adapted to hold sleeve labels 2 in the respective desired positions against the force of gravity.

In the case shown, positioning devices 50 are adapted to maintains sleeve labels 2 at relative distances H from surface 27 of relative upright 22 (FIG. 9), when respective sleeve drums 23 move integrally with corresponding containers 3 from the relative lifted positions to the relative totally retracted positions along arc ϵ of segment R.

Thereby, by adjusting transfer distance H of labels 10 from drum 13 to relative sleeve drums 23, the final position for applying sleeve labels 2 on respective containers 3 can be adjusted, as may be seen in FIG. 10.

Labelling machine 1 also includes:

a display system 84 (FIG. 1) adapted to control the angular position of each container 3 with respect to relative sleeve label 2 and about axis C, while the relative carrying unit 20 moves along an arc θ arranged downstream of arc $\gamma$ and upstream of arc $\epsilon$ of segment R with reference to the feeding direction of containers 3 along segment R; and an arc heater 85 adapted to heat, by blowing hot air, sleeve labels 2 arranged in the desired position so as to induce the partial thermal retraction of sleeve labels 2 on containers 3, along an arc $\psi$ arranged immediately downstream of arc $\epsilon$ of segment R and upstream of station O, with reference to the feeding direction of containers 3 along segment R.

Display system 84 is also configured to control actuators 81 so as to determine further rotations of sleeve drums 23 with respect to plates 29 about relative axes C, along arc $\theta$ of segment R.

Heater 85 is borne by a fixed portion (not shown) of machine 1 and is thus stationary with respect to axis B.

Positioning devices 50 are adapted to lock sleeve labels 2 along arc $\mu$ of path P and to let the above said sleeve labels 2 free along an arc $\nu$ of path P.

More in particular, arc $\mu$ extends from a station V up to station O of path P whereas arc $\nu$ extends from station O to station V of path P.

In particular, station V is interposed between station T and station O, proceeding along the feeding direction of carrying units 20 along path P.

Arc $\nu$ comprises, proceeding from station I to station V, arc $\alpha$, station T and arcs $\beta$, $\gamma$, $\theta$.

Arc $\mu$ comprises, proceeding from station V to station O, arcs $\epsilon$, $\psi$.

Figure 3:
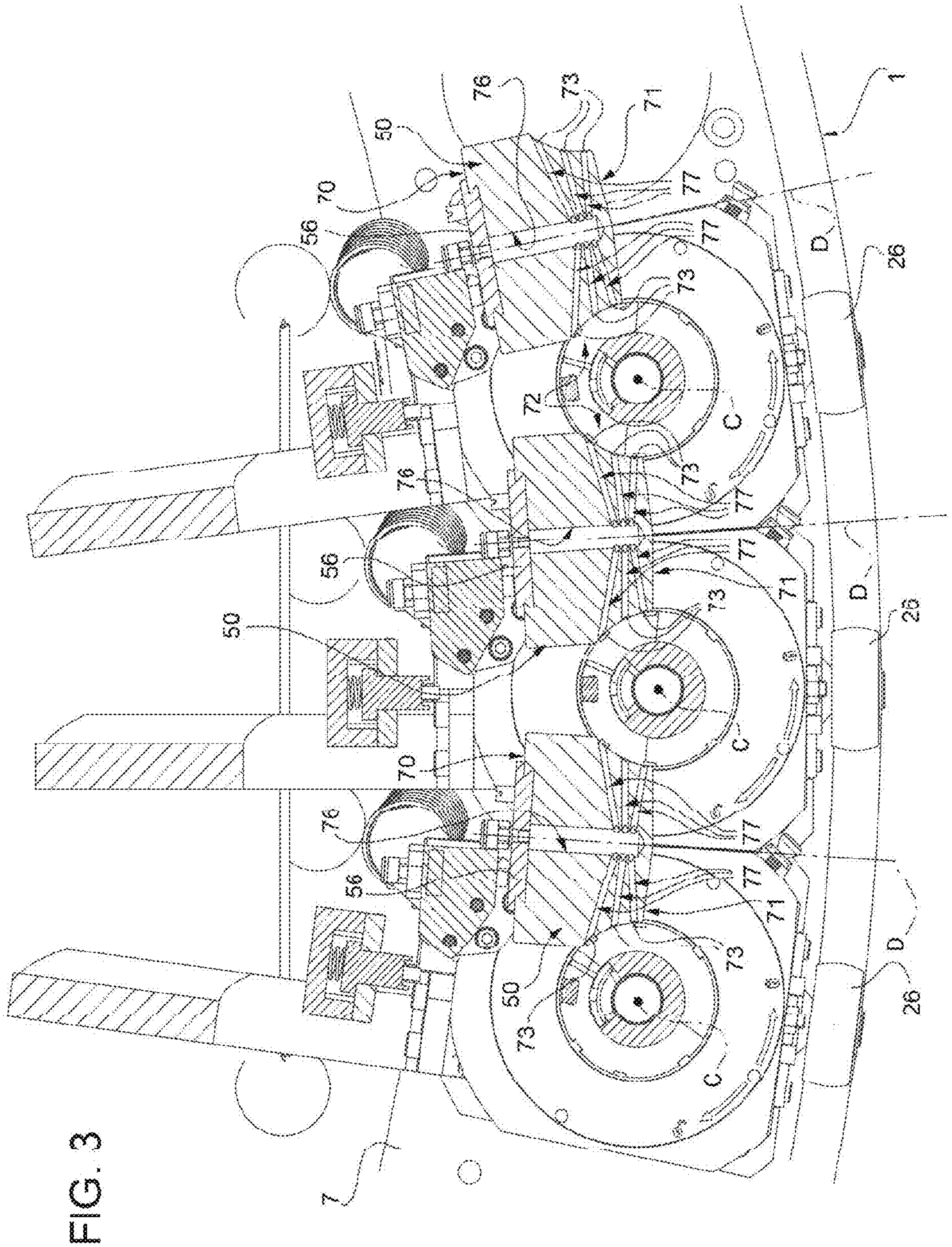
FIG. 3 shows a plan view on a further enlarged scale of the first components of the labelling machine of FIGS. 1 and 2.

In the case shown, each positioning device 50 is interposed circumferentially to axis B between two subsequent relative carrying units 20 and is adapted to cooperate with portions of two subsequent respective sleeve labels 2 to lock them in respective desired positions (FIGS. 3 and 4).

In other terms, each positioning device 50 is associated to a pair of subsequent carrying units 20.

Positioning devices 50 are also angularly equally spaced about axis B.

Positioning devices 50 also slide from and towards carrying units 20 along respective axes D orthogonal to axes C between retracted and forward positions.

In particular, positioning devices 50 are arranged in respective forward positions along arc $\mu$ of segment R so as to cooperate and lock sleeve labels 2.

On the other hand, positioning devices 50 are arranged in relative retracted positions along arc $\nu$ of segment R so as to result radially spaced from drums 23 along respective axes D.

In greater detail, carousel 7 comprises a plurality of supports 51 with respect to which positioning devices 50 are mobile between the retracted and forward positions.

Figure 6:
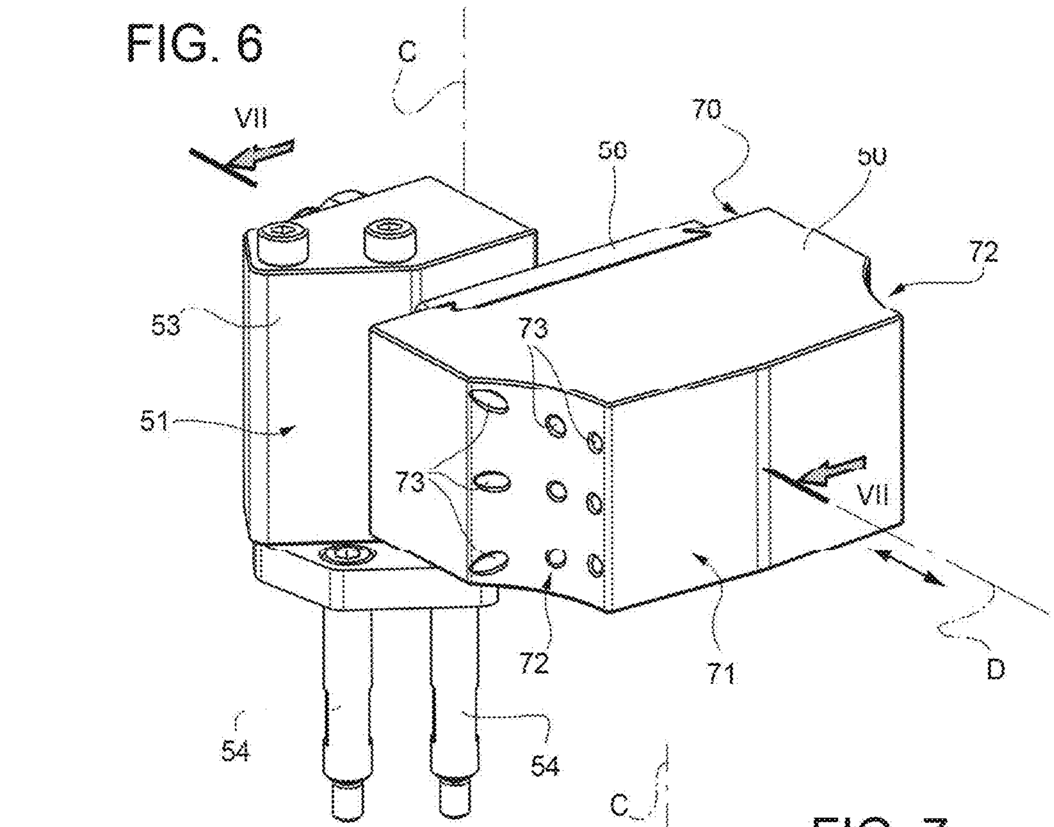
FIG. 6 shows a perspective view on a strongly enlarged scale of third components of the labelling machine of FIGS. 1 and 2.
Figure 7:
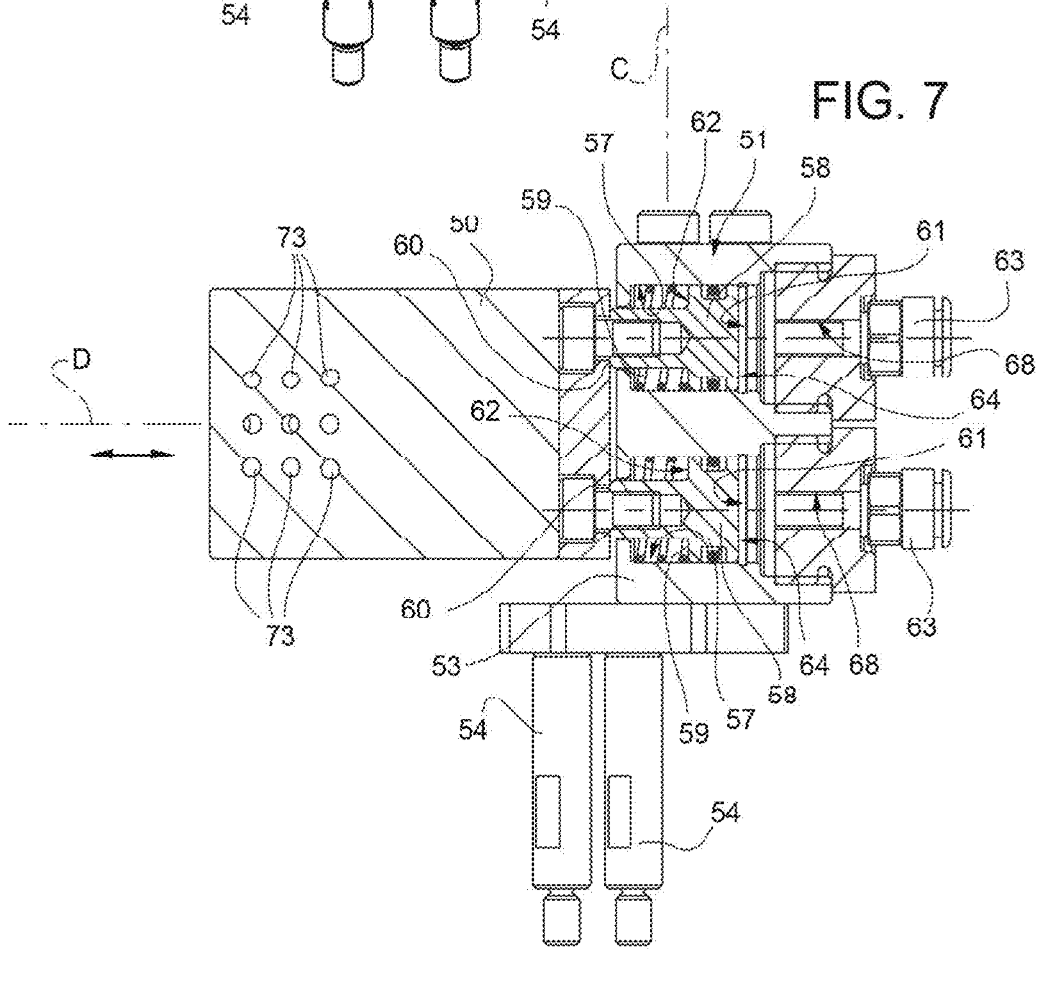
FIG. 7 is a section taken along line VII-VII of FIG. 6.

Each support 51 comprises in particular (FIGS. 6 and 7):

a body 53 fixed to a plate 55 (FIG. 1) by means of two rods 54 parallel to axis B; and an element 56 mounted on body 53 and defining a dovetailed guide elongated in parallel to axis C and engaged by relative positioning device 50.

Each body 53 (FIG. 7) comprises:

a pair of sleeves 57;

a pair of stems 58 sliding within sleeves 57 in parallel to respective axes D; and a pair of springs 59 interposed between respective stems 58 and respective sleeves 57.

Each stem 58 further comprises:

an axial end 60 through which a screw connected to relative positioning device 50 passes, in the case shown by means of a threaded connection;

an axial end 61 opposite to end 60; and a shoulder 62 interposed between ends 90, 91 along relative axis D.

Sleeves 57 of each body 53 are also closed, on the opposite side of positioning devices 50, by respective caps 63.

Caps 63 and ends 61 of stems 58 define respective chambers 65, and comprise respective ducts 68 fluidically connected with chambers 64 and fluidically connectable selectively with a source of pressurised air.

Springs 59 are interposed between shoulders 62 or respective stems 58 and the portions of respective sleeves 57 opposite to relative caps 63.

Springs 59 of each support 51 also preload stems 58 towards caps 63 and therefore maintain respective positioning device 50 in the respective retracted position along relative axis D with respect to drums 23.

Positioning devices 50 are displaceable in the respective forward positions along relative axes D with respect to drums 23, feeding compressed air (in a manner not disclosed as it is not relevant for understanding the present description) within ducts 68, along arc $\mu$ of segment R.

Thereby, a pressure is generated within respective chambers 64, which causes the displacement of respective stems 58 and thus of positioning devices 50 towards drums 23 and against the action of springs 59.

Each positioning device 50 comprises:

a flat surface 70, opposite to drums 23 of relative carrying units 20 and engaging the dovetailed guide defined by element 56;

a surface 71 formed by two flat incident portions, opposite to surface 70 and facing relative sleeve drums 23; and a pair of curved surfaces 72 between which relative surface 71 is interposed.

Surfaces 72 of each positioning device 50 are, in the case shown, configured as cylinder arcs and are interposed, along relative axis D, between surfaces 70, 71.

When sleeve drums 23 are in the lifted position, surfaces 72 of each positioning device 50 face and embrace respective portions of surfaces 25 of sleeve drums 23 and respective portions of sleeve labels 2 wound on above said surfaces 25.

Surfaces 72 of each positioning device 50 comprise a plurality of holes 73 selectively connectable to a plurality of vacuum sources 65 diagrammatically indicated in FIG. 1.

More precisely, each positioning device 50 comprises (FIG. 3):

a channel 76 radial to axis B and parallel to axis D, passing through surface 62 and connectable to vacuum source 65; and a plurality of channels 77 each interposed between channel 76 and respective holes 73.

In the case shown, each positioning device 50 is formed by (FIG. 4):

a body 78 defining surfaces 70, 71, 72 and channels 76, 77;

a pair of elements 79 defining respective holes 73.

In particular, elements 79 are made of an elastomeric material, in the case shown, silicone (FIG. 4).

In particular, machine 1 comprises a distributor 80 which is fixed with respect to axis B (FIG. 1).

Distributor 80 comprises in turn:

a plurality of vacuum sources 65;

an annular plate 82 having axis B and defining a plurality of through-slots 83 fluidically connected to vacuum sources 65.

Carousel 7 comprises an annular plate 88 having axis B, rotatable about axis B and resting on plate 82.

Carousel 88 also includes:

- a plurality of through-slots 86 (only some of which are shown in FIG. 1) resting on plate 82 and fluidically connected with channels 76 and thus with holes 73 of positioning device 50; and
- a plurality of further slots 87 (only some of which are shown in FIG. 1) resting on plate 82 and fluidically connected with holes 30 of sleeve drums 23.

Slots 86 are placed at slots 83 along arc μ of path P and are shifted with respect to slots 83 circumferentially to axis B along arc ν of path P.

Therefore, holes 73 exert a suction action on respective sleeve label 2 along arc μ and exert no suction action along arc ν.

Slots 87 are placed at slots 83 along arc μ of path P and are shifted with respect to slots 83 circumferentially to axis B along the remaining portion of path P, so that holes 30 exert a suction action on labels 10 along arc β of path P.

Finally, labelling machine 1 can apply sleeve labels 2 having different formats and in different positions on relative containers 3.

For this purpose it is sufficient:

- to remove positioning devices 50 corresponding to the previous format of sleeve labels 2 from relative supports 51 and connect new positioning devices 50 corresponding to the new format of sleeve labels 2 on relative supports 51; and/or
- to vary distance H from surface 27 of upright 22, to which drum 13 transfers sleeve labels 2 from respective carrying units 20.

The operation of labelling machine 1 is disclosed hereinafter with reference to a single container 3 and to a single carrying unit 20, and from the time in which container 3 is provided in the lowered position by starwheel 11 to carousel 7 at station I.

At station I, wall 5 of container 3 is rested on surface 24 of plate 29 and neck portion 4 of container 3 cooperates with free portions 36 of element 35.

Moreover, at station I, positioning device 50 is arranged in the retracted position along axis D and holes 73 of surfaces 72 are fluidically isolated from vacuum sources 65, along whole arc ν of path P.

More precisely, slots 86 are shifted with respect to slots 83 in a direction circumferential to axis B, along arc ν of path P.

Thereby, channel 76 is fluidically isolated from vacuum sources 65 and holes 73 of positioning device 50 exert no suction action.

Ducts 68 and thus chambers 64 are discharged and springs 59 elastically load stems 58 towards caps 63, maintaining positioning device 50 in the retracted position along axis D.

Container 3 is displaced from the lowered position to the lifted position along arc α of path P.

Along arc α, the interaction between cam and cam follower 26 determines the displacement of sleeve drum 23 along axis C from the completely retracted position to the completely lifted position.

At station T, drum 13 transfers flat labels 10 to surface 25 of sleeve drum 23 at distance H from surface 27 of upright 22.

Such a distance H determines the final application position of sleeve label 2 on container 3.

Sleeve drum 23 rotates about relative axis C along arc β of segment R, so that label 10 exiting from drum 13 winds completely on surface 25 and forms a cylinder with opposite edges 32 overlapped.

Along arc β, the suction action of holes 30 maintains label 10 wound at distance H from surface 27 of upright 22.

At arc γ of segment R, welding device 40 welds edges 32 of label 10 and forms sleeve label 2.

Sleeve label 2 is also maintained at distance H from surface 27, along arc β of path P.

At this point (FIG. 8), sleeve label 2 surrounds containers 3, but is not yet fixed to container 3.

The further feeding of carousel 7 carries containers 3 with respective sleeve labels 2 along arc θ of segment R.

At this point, display system 84 detects the angular position of each container 3 with respect to relative sleeve label 2 about axis C and controls, on the basis of the difference between this detected angular position and the desired angular position, a further rotation of sleeve drum 23 about axis C.

This rotation of sleeve drum 23 does not cause the rotation of container 3, as container 3 is retained between plate 29 and free portion 36 of element 35.

In other words, the friction due to the presence of container 3 prevents the rotation of plate 29 with sleeve drum 23.

At station V and up to station O, positioning device 50 is displaced from the retracted position to the forward position along axis D and vacuum sources 65 are fluidically connected with holes 73 of surface 72.

More precisely, when positioning device 50 is arranged in the forward position, surfaces 72 embrace respective portions of two sleeve labels 2 surrounding two subsequent containers 3.

In virtue of the suction action exerted by holes 73, positioning device 50 locks the above said two sleeve labels 2 at distance H from surface 27 of respective uprights 22 along the whole arc μ of path P.

More precisely, along arc μ, slots 86 are overlapped to slots 83.

Thereby, channel 76 is connected to vacuum sources 65 and holes 73 of positioning device 50 exert a suction action on sleeve labels 2 carried by two carrying units 20 associated to positioning device 50.

Ducts 68 are also connected to a compressed air source, so as to increase the pressure in chambers 64.

This pressure displaces, under the action of springs 59, stems 58 along axis D and towards sleeve drums 23, bringing positioning device 50 in the forward position.

Along arc ϵ of the path, the interaction between cam and cam follower 26 determines the displacement of container 3 from the lifted position to the lowered position.

In particular, while sleeve drum 23 is fed along arc ϵ, it is displaced along axis C from the lifted position to the totally lowered position.

As may be seen in FIG. 10, this displacement determines a relative motion along axis C between container 3 and sleeve label 2 locked by the positioning device.

This motion determines the final positioning of sleeve drum 2 with respect to container 3 in the desired position along axis C.

Finally, while container 3 is fed along arc ψ, sleeve label 2 is heated by heating device 85. This determines the thermal retraction of sleeve label 2 and the subsequent application—at least preliminary application—to container 3.

Hereinafter, container 3 with applied sleeve label 2 reaches station O of path P and is transferred to starwheel 12 and to conveyor 8.

From an analysis of the features of labelling machine 1 and of the relative method according to the present subject matter, the advantages it allows to obtain are apparent.

In particular, in virtue of the presence of positioning devices 50, machine 1 allows to position sleeve labels 2 in the respective desired positions along axes C with respect to containers 3, simply by locking sleeve labels 2 while containers 3 are displaced from the respective lifted positions to the respective lowered positions.

In particular, machine 1 requires no additional module for positioning sleeve labels 2 in the respective desired positions, thus resulting especially simple to manufacture and maintain with respect to the known solutions cited in the introduction of the present description.

Furthermore, machine 1 allows, in virtue of display system 84 and of the actuator controlled thereby, to correct the angular position of sleeve labels 2 with respect to relative containers 3 and about relative axes C, after sleeve labels 2 have been formed along arc γ and before sleeve labels 2 are locked along arc μ.

Thereby, machine 1 allows to apply sleeve labels 2 in respective desired angular positions on respective containers 3 with reference to respective axes C.

There follows that machine 1 has functionalities which known solutions cited in the introduction of the present description do not have.

Finally, machine 1 uses the same vacuum sources 65 both to create a suction action at holes 30 of sleeve drums 23 and at holes 73 of positioning devices 50.

Finally, it is apparent that modifications and variants not departing from the scope of protection of the claims may be made to machine 1 and to the method disclosed herein.

In particular, sleeve label 2 could be arranged in the desired position by locking containers 3 and moving sleeve labels 2 with respect to containers 3.

Furthermore, sleeve labels 2 could vary the distances thereof from surfaces 27 of respective uprights 22, while they are fed from station T to station V and reach distance H only at station V.

What is claimed is:

1. A labelling machine for applying at least one sleeve label on a respective article, comprising:

a conveyor movable along a path comprising, in turn, a first inlet station to receive said article still to be labelled and a second outlet station to output said article labelled, said conveyor comprising:

a handling device adapted to form said sleeve label from said flat label at a transfer distance (H) from said reference plane and displace, parallel to a first axis, at least one of said sleeve label and said article still to be labelled, while said article is travelling, in use, along a first segment (ϵ) of said path, so as to insert said article still to be labelled within said sleeve label, a positioning device having at least one curved surface engagable to said sleeve label to actively position and maintain, in use, said sleeve label in a desired position at said transfer distance (H) from said reference plane along said along a second segment (μ) of said path;

wherein said first segment (ϵ) being comprised within said second segment (μ); and a transfer module adapted to transfer a flat label to said handling device at said transfer distance (H) from said reference plane movable integrally with said conveyor along said path;

wherein said transfer distance (H) is adjustable, such that the final position for applying said sleeve label on respective article is adjustable.

2. The machine according to claim 1, wherein said positioning device is selectively available in at least one of:

a first configuration in which it is configured to lock said one of said article and said sleeve label, along said second segment (μ) of said path; and a second configuration in which it is configured to allow said one of said article and said sleeve label to be free, at least along a third segment (ν) of said path arranged upstream of said second segment (μ), proceeding according to a feeding direction of said article along said path.

3. The machine according to claim 2, wherein said positioning device is movable along a second axis (D) transversal to said first axis with respect to said handling device between:

a forward position reached along said second segment (μ) of said path and at which it cooperates with said second of said article and said sleeve; and a retracted position reached along said third segment (ν) of said path and at which it is spaced from said handling device.

4. The machine according to claim 3, wherein said conveyor comprises a support for said positioning device;

said support comprising an actuator connected to said positioning device and displaceable, under the action of a control and along said second segment (μ), together with said handling device along said second axis (D) and towards one of said forward and retracted positions; and at least one spring housed within said support and adapted to load, in use, said actuator and said positioning device, towards the other of said forward and retracted positions.

5. The machine according to claim 2, wherein said at least one curved surface is adapted to cooperate with at least one portion of said sleeve label, along said second segment (μ) of said path;

said surface comprising at least one plurality of holes connected to a vacuum source when said positioning device is in said first configuration, so as to exert a suction action on said sleeve label;

said holes being functionally uncoupled from said vacuum source when said positioning device is in said second configuration, so as to let said sleeve label free.

6. The machine according to claim 5, comprising:

a vacuum source which is stationary with respect to said path; and a distributor rotatable integrally with a carousel along said path;

said distributor being adapted to maintain said vacuum source and said holes fluidically connected, along said second segment (μ) and to fluidically isolate said vacuum source and said holes, along said third segment (ν);

said handling device being adapted to retain, under vacuum, a flat label intended to form said sleeve label, along a fourth segment (β) of said path;

said distributor being adapted to fluidically connect said vacuum source and said handling device, during said fourth segment (β).

7. The machine according to claim 5, wherein said positioning device comprises an insert defining said surface and made of an elastically deformable material.

8. The machine according to claim 1, comprising:

a vision system configured to detect a relative angular position between said sleeve label and said article about a third axis (A, along a fifth segment (θ) of said path; and an actuator to be controlled, in use, on the basis of said angular position detected by a display system and adapted to determine a further relative rotation between said sleeve label and said article about said first axis, along said fifth segment (θ) of said path.

9. The machine according to claim 2, wherein said fifth segment (θ) is comprised within said third segment (ν), so that said angular position is to be detected and said further rotation is to be controlled, in use, when said positioning device is in said second configuration.

10. The machine according to claim 2, comprising a heating unit adapted to heat said sleeve label to cause said thermal retraction thereof along a sixth segment (ψ) of said path;

said sixth segment (ψ) being comprised within said second segment (μ), to cause said thermal retraction of said sleeve label when said positioning device is in said first configuration.

11. The machine according to claim 1, comprising at least:

two carrying units adapted to carry respective articles along said path movable integrally with said conveyor;

at least two said handling devices carried by respective carrying units and adapted to insert respective articles within at least two respective sleeve labels;

said positioning device being adapted to actively position said at least two sleeve labels in respective desired positions with respect to said article.

12. The machine according to claim 5, wherein said positioning device comprises a pair of surfaces adapted to cooperate with respective portions of said at least two sleeve labels.

* * * * *